Patented Oct. 10, 1933

1,929,868

UNITED STATES PATENT OFFICE 1,929,868

CELLULOSE DERIVATIVE HAVING A STRONG AFFINITY FOR ACID DYESTUFFS, AND A PROCESS OF MAKING SAME

Robert Haller, Riehen, near Basel, and Alphonse Heckendorn, Basel, Switzerland, assignors to firm Society of Chemical Industry in Basle, Basel, Switzerland No Drawing. Application February 4, 1931, Serial No. 513,456, and in Switzerland February 11, 1930

7 Claims. (Cl. 8—20)

The invention relates to the production of new textile from cellulose having a strong affinity for acid dyestuffs and comprises the process of making these textiles, as well as the new textile themselves.

It is known that by treating alkali xanthates with mild oxidation agents or with compounds, such as, for example phosgene, thiophosgene, sulfur chloride, chlorocarbonic esters, acetyl chloride, or the like, the xanthate is converted into bodies which twice contain the residue of the dithiocarbonic acid, it may be in the manner of an anhydride.

It has now been found that by treating cellulose with alkali and carbon disulfide and then with the above named reagents, preferably in the presence of an excess of carbon disulphide as a medium for the reaction, and then converting the products thus formed with diamines of aliphatic character, new cellulose derivatives are obtained, which, while retaining the original fibrous structure, contain sulfur and nitrogen, and possess a strong affinity for acid and direct dyestuffs.

As parent material for the manufacture of the cellulose-xanthates or cellulose xanthate derivatives there come chiefly into question the loose or spun cotton, or the like.

The following examples illustrate the invention, the parts being by weight:—

Example 1

30 parts of cotton are impregnated with an alcoholic solution of 15 per cent. strength of caustic potash, then centrifuged or pressed to expel the solution and treated for 48 hours, in 800 parts of carbon bisulfide. The whole is then acidified by means of 10 parts of acetic acid and so much iodine in carbon bisulfide is added gradually that the brownish-red color produced in the solution no longer disappears. After 1 hour the product is washed, pressed and treated in an aqueous solution of 10 per cent. strength of piperazine or diethylethylenediamine, to which some hydrosulfite may be added, for 4–12 hours on the water-bath; separation of sulfur and sulfuretted hydrogen occurs. The whole is now washed and dried. The fiber thus treated has affinity for all acid dyestuffs.

The process may be conducted in an analogous manner with other oxidizing agents than iodine, for example benzoyl peroxide, para-toluenesulfodichloramine (peractivine), amyl nitrite, or oxides of nitrogen.

Example 2

10 parts of cotton in loose condition or spun are impregnated with an alcoholic solution of 15 per cent. strength of caustic potash, pressed and treated for 24 to 48 hours in carbon bisulfide. There are then added 5 parts of sulfur chloride dissolved in some carbon bisulfide while continuously moving the fiber. After 1 hour the material is pressed to remove carbon bisulfide, rinsed in warm water, and treated in an aqueous solution of 5–10 per cent. strength of piperazine for 3 hours at the temperature of the boiling water-bath. It is then thoroughly washed and dried.

Example 3

10 parts of cotton are impregnated with an alcoholic solution of 15 per cent. strength of caustic potash, freed from excess of the solution and treated for 48 to 72 hours in carbon bisulfide. There is then added a solution of phosgene (prepared by dissolving 5–10 parts of phosgene in carbon bisulfide in the cold), whilst continuously moving the material, and preferably whilst maintaining a temperature below 8° C. The progress of the reaction is indicated by evolution of a small quantity of gas. After half an hour the fiber is rinsed in warm water and then treated for 2–6 hours at the temperature of the boiling water-bath with an aqueous solution of 10 per cent. strength of piperazine. It is then thoroughly washed and dried.

A like product is obtained by using instead of phosgene, chlorocarbonic ester and increasing the duration of the treatment with this agent, for example to 24 hours.

Example 4

Cotton is printed locally with a thickening consisting of 40 cc. of caustic soda solution of 36° Bé. and 60 grams of British gum 1:1 and then immersed for 48 hours in carbon bisulfide.

The material is then further treated in the manner described in any of the foregoing examples first either with iodine in presence of dilute acetic acid, or with sulfur chloride, phosgene or the like, and thereafter with an aqueous solution of piperazine. At the places which have been treated the cotton is dyed intensely and fast by means of acid dyestuffs.

Example 5

Cotton which has been treated as described in one of the foregoing examples is dyed in a bath containing 3 per cent. of tartrazine or Kiton red G and 3 per cent. of acetic acid of 10 per cent. strength (all calculated on the weight of the fiber). The goods are entered at 30–40° C., the bath is heated to boiling and dyeing continued for ¾ hour. The dye-bath is exhausted completely in a short time. The dyeings are characterized by good fastness to water and washing.

What we claim is:—

1. The manufacture of new cellulosic textiles which have conserved the original structure of the fiber, contain sulfur and nitrogen, and have a strong affinity for acid dyestuffs without prejudice to their affinity for direct dyestuffs, consisting in treating textiles consisting of cellulose xanthates, in the presence of carbon disulfide, with such agents which are capable of linking together two cellulose xanthogenate molecules, and then converting the products thus formed with diamines of aliphatic character.

2. The manufacture of new cellulosic textiles which have conserved the original structure of the fiber, contain sulfur and nitrogen, and have a strong affinity for acid dyestuffs without prejudice to their affinity for direct dyestuffs, consisting in treating textiles consisting of cellulose xanthates with phosgene, in the presence of carbon disulfide, and then converting the products thus formed with diamines of aliphatic character.

3. The manufacture of new cellulosic textiles which have conserved the original structure of the fiber, contain sulfur and nitrogen, and have a strong affinity for acid dyestuffs without prejudice to their affinity for direct dyestuffs, consisting in treating textiles consisting of cellulose xanthates with phosgene, in the presence of carbon disulfide, and then converting the products thus formed with piperazine.

4. The cellulosic textiles which are obtained by treating textiles consisting of cellulose xanthate, in the presence of carbon disulfide, with such reactive agents which are capable of linking together two cellulose xanthogenate molecules, and then converting the products thus formed with diamines of aliphatic character, which products show the original fibrous structure, contain sulfur and nitrogen, and possess affinity for acid and direct dyestuffs.

5. The modified cellulosic textiles consisting of the reaction product having the probable formula

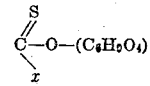

wherein $x$ stands for the residue of a diamine of aliphatic character which is linked by a nitrogen atom to the carbon atom, which textiles show the original fibrous structure of unmodified cellulosic textiles and possess affinity for acid and direct dyestuffs.

6. The modified cellulosic textiles consisting of the reaction product having the probable formula

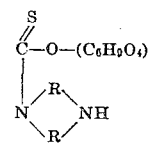

where R stands for an alkylene group, which textiles show the original fibrous structure of unmodified cellulosic textiles and possess affinity for acid and direct dyestuffs.

7. The modified cellulosic textiles consisting of the reaction product having the probable formula

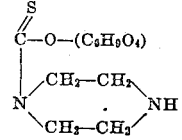

which textiles show the original fibrous structure of unmodified cellulosic textiles and possess affinity for acid and direct dyestuffs.

ROBERT HALLER.
ALPHONSE HECKENDORN.